US006050214A

United States Patent [19]

OKeefe

[11] Patent Number: 6,050,214

[45] Date of Patent: Apr. 18, 2000

[54] DEVICE FOR INDICATING A RESTAURANT PATRON'S STATUS

[76] Inventor: Penny Marie OKeefe, 7020 Pershing, University City, Mo. 63130

[21] Appl. No.: 09/034,783

[22] Filed: Mar. 4, 1998

[51] Int. Cl.[7] .............................. B42D 3/18; G01D 13/22

[52] U.S. Cl. .......................... 116/323; 116/307; 283/60.2

[58] Field of Search .................................... 116/306, 307, 116/321, 322, 323, 324; 283/60.1, 60.2

[56] References Cited

U.S. PATENT DOCUMENTS

| | | | |
|---|---|---|---|
| 471,124 | 3/1892 | Kelley | 116/323 |
| 890,438 | 6/1908 | Mutzenberg . | |
| 1,076,180 | 10/1913 | Wicklund | 116/324 |
| 1,436,533 | 11/1922 | Rich | 116/323 |
| 1,892,163 | 12/1932 | Rose | 116/323 |
| 1,899,382 | 2/1933 | Berry | 116/324 |
| 2,114,806 | 4/1938 | Massafra . | |
| 2,134,138 | 10/1938 | Manzler . | |
| 2,531,142 | 11/1950 | Madison . | |
| 2,579,686 | 12/1951 | Mallory | 40/535 |
| 2,659,486 | 11/1953 | Krupin | 206/565 |
| 2,751,878 | 6/1956 | Bodor | 116/323 |
| 3,061,963 | 11/1962 | Buckley, Jr. | 40/389 |
| 3,126,862 | 3/1964 | Hanley . | |
| 3,719,161 | 3/1973 | Wegner . | |
| 3,760,766 | 9/1973 | Wopschall . | |
| 3,884,507 | 5/1975 | Fumel . | |
| 3,913,249 | 10/1975 | Kaslow | 40/488 |
| 4,794,877 | 1/1989 | Pollard-Smith | 116/323 |
| 4,926,786 | 5/1990 | White | 116/324 |
| 4,951,596 | 8/1990 | Wallace, Jr. | 116/321 |
| 5,305,706 | 4/1994 | Arjomand | 116/234 |

FOREIGN PATENT DOCUMENTS

| | | | |
|---|---|---|---|
| 2725127 | 12/1978 | Germany | 116/306 |

*Primary Examiner*—Andrew H. Hirshfeld
*Assistant Examiner*—R A Smith
*Attorney, Agent, or Firm*—Haverstock, Garrett and Roberts LLP

[57] ABSTRACT

A preferred embodiment of the present invention is an apparatus for indicating a patron's status in a restaurant, the apparatus comprising one or more color-coded subsections on a device within the patron's reach. The present apparatus includes a movable indicator that the patron may position over a selected subsection to communicate a particular message to the waiter. A legend positioned on or near one or more of the subsections may provide a description of the message corresponding to a particular color. The status indicating apparatus may be incorporated in a device for handling the patron's check and payment, such as a portfolio or tray, or in some other structure such as the edge of the patron's table or a fixture on the table.

12 Claims, 5 Drawing Sheets

DEVICE FOR INDICATING A RESTAURANT PATRON'S STATUS

TECHNICAL FIELD

The present invention relates generally to devices used in food and beverage establishments for collecting payment from patrons, and more particularly, to a combination device for holding the check for a patron's order, holding the patron's payment, and indicating patron status.

BACKGROUND

There are often times when patrons in a dining or drinking establishment wish to communicate with their waiter, but are unable to attract their attention. These occasions may arise throughout the entire time that a patron is present in the establishment, such as while reading the menu, after the order is served, and after the check is presented. A waiter may not always stop by the patron's table at the time the patron wishes to speak to them. Further, the waiter may hesitate to interrupt a conversation between patrons and therefore may not ask the patrons if they need anything when in fact, they would like service.

Many retail food and beverage establishments currently use some sort of device for presenting a patron's check for their order and for holding the patron's payment until it is collected by the waiter. There are many such devices used for this purpose including plastic or leather-covered portfolios with pockets or clips on the inner portion for retaining the check, paper money, and credit cards. Plastic or metal trays with and without clips for retaining the check, credit card, and paper money, and having raised edges for retaining coins, are also frequently used.

A waiter will often place the device on a table with the check and return later to collect payment. A patron may wish to have the waiter return if there are questions regarding the check and therefore a need exists for means to signal the waiter to return to the table. Further, it is desirable to provide means to indicate to the waiter when the patron has placed payment inside the device, along with the form of payment, such as cash or credit card.

Accordingly, the present invention is directed to overcoming one or more of the problems as set forth above.

DISCLOSURE OF THE INVENTION

The present invention is an apparatus for indicating patron status in an eating or drinking establishment. The apparatus includes indicator means having one or more subsections and a movable indicator that the patron places over a particular subsection to provide a visual cue to a waiter when the patron requires assistance. Once the waiter has responded to the patron's request, the indicator is moved to a different portion that indicates that the patron does not need assistance. If the patron requires further assistance at some later time, he may again move the indicator means to the appropriate subsection. The subsections may be color-coded and a legend describing the meaning of each color may be included.

One embodiment of the present invention includes a bi-fold portfolio with indicator means including a color-coded bar on one edge with an indicator slidably attached thereto. The color-coded bar is divided into subsections, each subsection having a different color corresponding to a different patron status or request. The indicator i movable along the edge to be positioned over one of the different colors to indicate to the waiter when the patron requires assistance. A variable number of colors may be used on the bar, depending on the needs of the particular drinking or eating establishment. The portfolio may include retaining means such as a clip or pocket for holding the check and payment.

In another embodiment of the present invention, an apparatus for holding the check for a patron's order, holding the patron's payment and indicating patron status includes a tray having a color-coded portion with indicator means attached thereto. The color-coded portion includes several subsections, each subsection being a different color to correspond to a request that a patron may have. The color-coded portion may be linear or arcuate. The indicator may be a slidable marker or a rotatable dial. The tray may include retaining means such as a clip or pocket for holding the check and payment, and an edge around the perimeter for retaining coins.

In another embodiment of the present invention, the indicator means includes a circular disk divided into several subsections, each subsection being a different color corresponding to a different patron status or request. A portfolio or tray includes an indicator window on the front and the circular disk is rotatably attached to the portfolio so that the disk may be rotated until the desired subsection appears in the indicator window.

In yet another embodiment of the present invention, the indicator means comprises a series of windows with sliding or hinged covers that may be included on a device for presenting the check for a patron's order and holding the patron's payment, such as a portfolio or a tray. Each cover overlays a different color-coded subsection, wherein each subsection color corresponds to a different patron status or request.

BRIEF DESCRIPTION OF DRAWINGS

FIG. 1*c* is a perspective view of a portfolio having another type of slidable indicator means along one edge;

BEST MODE FOR CARRYING OUT THE INVENTION

Figure 1:
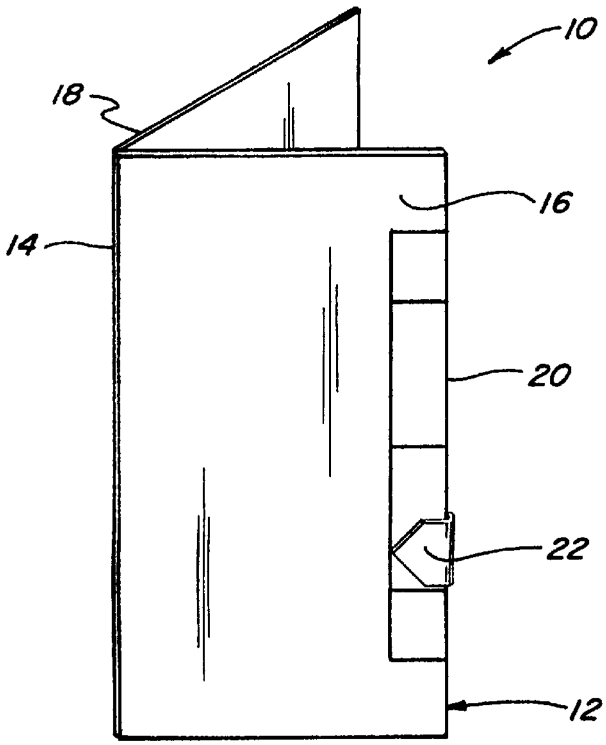
FIG. 1 is a perspective view of a portfolio having a color-coded bar and indicator means along one edge.
Figure 1A:
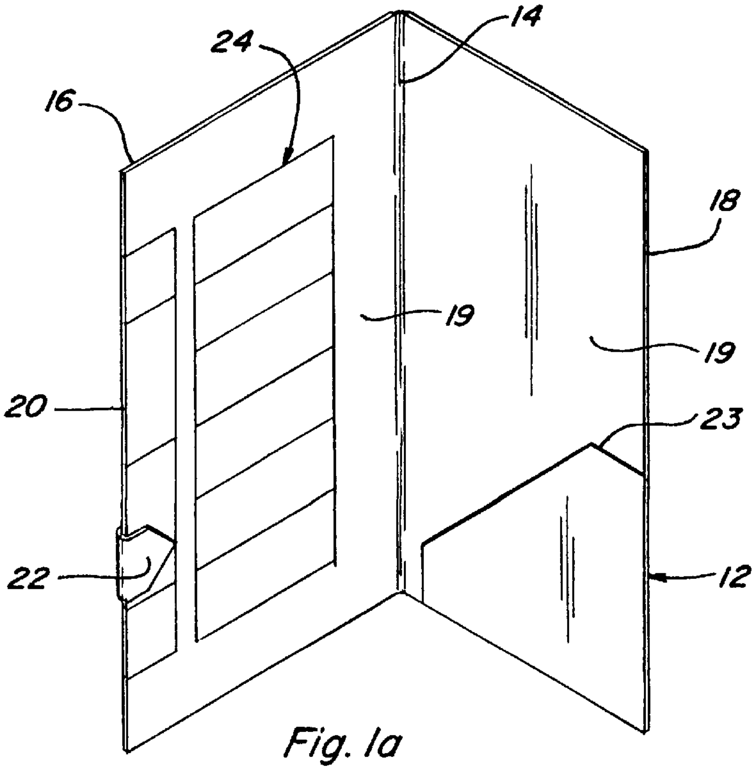
FIG. 1*a* is a perspective view of the inner portion of a portfolio having a color-coded bar and indicator means along one edge.

Referring to the drawings, FIGS. 1 and 1*a* show a preferred embodiment of a check holding device 10 for holding a check for a patron's order, holding the patron's payment, and indicating patron status in an eating or drinking establishment. The check holding device 10 is a portfolio 12 having a fold 14 approximately down the middle, a front portion 16, a back portion 18, and an inner portion 19 between the front portion 16 and the back portion 18. The front portion 16 of the portfolio 12 includes a color-coded bar 20 along one edge and indicator means comprising a slidable indicator 22. The color-coded bar 20 is divided into subsections, with each subsection having a different color. The various colors signify different messages that a patron may want to communicate to a waiter. The patron slides the indicator 22 over a particular color to visually communicate when he or she has questions regarding the menu or check, or requires other assistance as defined by a particular color. The portfolio 12 may include a pocket 23, a clip (not shown), or some other means for retaining items such as a pen, pieces of paper, and coins, in the inner portion 19 of the portfolio 12.

Figure 1B:
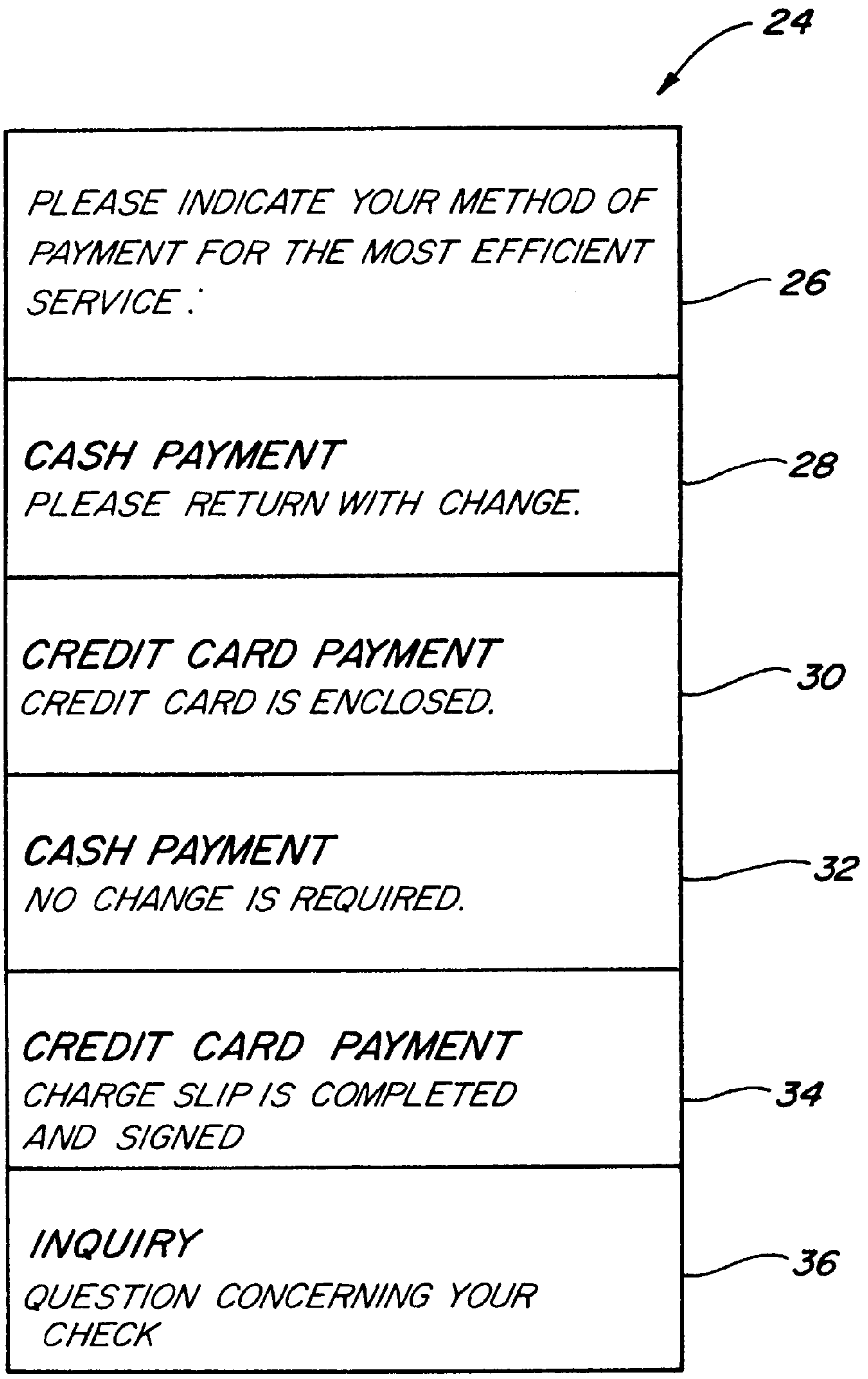
FIG. 1*b* is an example of a legend for decoding the meaning of the colors on the color-coded bar.

A legend 24 may be provided adjacent the color-coded bar 20 to assist the patron in selecting the appropriate color over which to slide the indicator 22. The legend 24 may include a variety of descriptions, depending on the requirements of the particular eating or drinking establishment. An example of one embodiment of a legend 24 which is useful once the check has been presented to the patron is shown in FIG. 1*b*. The subsections 26, 28, 30, 32, 34, 36 of the legend 24 each pertain to a different situation that may occur when a patron presents payment while seated at a table. Typically, the waiter will enclose the check inside the portfolio 12, place it on the table, and walk away. After reviewing the charges and total, the patron may have a question. Accordingly, the patron may slide the indicator 22 over subsection 36 to alert the waiter that he requires assistance. Once the waiter responds to the patron's question, he may move the indicator 22 to the top subsection. Once the patron encloses payment, the patron may slide the indicator 22 over subsections 28 or 32 to indicate whether change is required from a cash payment, and over subsections 30 or 34 to indicate when a credit card is enclosed and the charge slip is completed.

Any number of messages may be included with the present invention. For example, a particular establishment may determine that they require just one subsection to allow a patron to indicate when payment is enclosed in the portfolio. Other establishments may require more than one subsection with different messages corresponding to each subsection. The present invention thus provides means for the patron to communicate various messages to a waiter without requiring the patron to gesture or call out to the waiter.

Figure 1C:
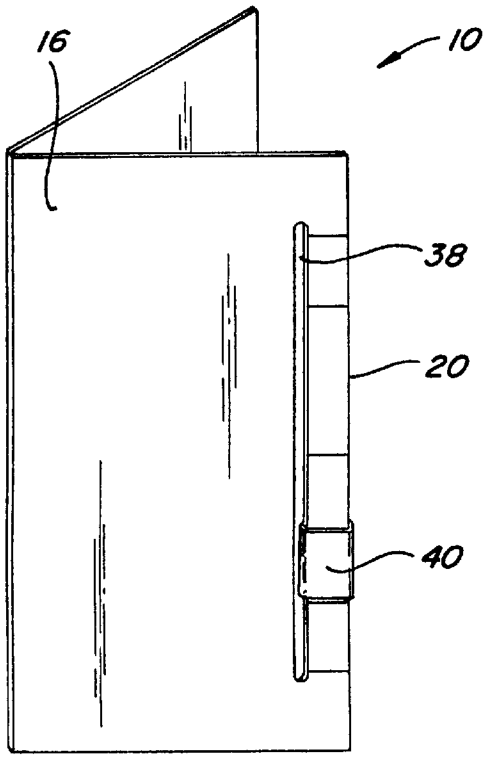
FIG. 1*c* is a perspective view of a portfolio having another type of indicator means along one edge.
Figure 1D:
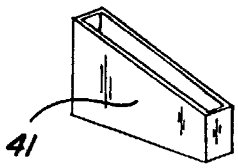
FIG. 1*d* is a perspective view of indicator means.

The slidable indicator 22 shown in FIGS. 1 and 1*a* may be formed of a clip having a U-shaped cross-section that engages the edge of the portfolio 12 and is retained by frictional forces that allow a patron to slide the indicator 22 along the color-coded bar 20. In an alternative embodiment of the present invention, a slot 38 may be cut through the front portion 16 of the check holding device 10 as shown in FIG. 1*c* to accommodate a slidable indicator 40 in the form of a band that wraps around the color-coded bar 20. The slot 38 may extend partially or fully along the length of the color-coded bar 20 and may be as wide as necessary to allow movement of the slidable indicator 40 when it is wrapped around the color-coded bar 20. The slidable indicator 40 may be sized to grip the color-coded bar 20 firmly enough to be retained in place until it is intentionally moved to another position on the bar 20. The indicator 40 may be made of rigid or flexible material including metal, plastic, or wood. The color of the slidable indicator 40 should contrast with the colors on the bar 20 to provide an effective visual cue for a passing waiter. The slidable indicator 40 may have any desired shape. One consideration is that the visible portion should be large enough to be seen from a reasonable distance. For example, the indicator 40 may be a band having a constant width as shown in FIG. 1*c*. Alternatively, a band 41 having two opposing triangularshaped sides as shown in FIG. 1*d*, may be used. If the indicator is constructed of flexible material, the patron may slide the indicator 40 to a desired position and then crimp or squeeze the indicator 40 to keep it in place.

Figure 1E:
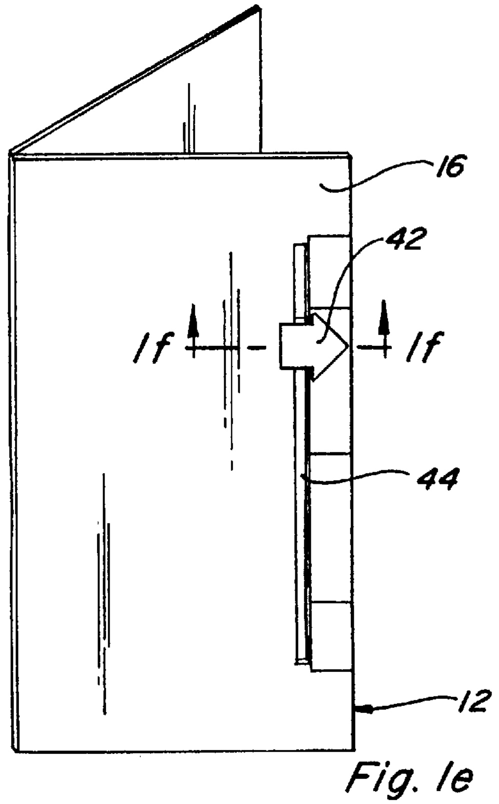
FIG. 1*e* is a perspective view of a portfolio having another type of indicator means along one edge.
Figure 1F:
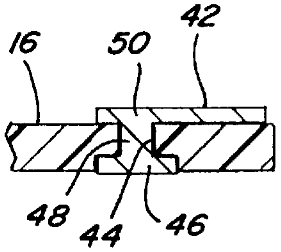
FIG. 1*f* is a partial cross-sectional view of indicator means engaged in a channel.

FIGS. 1*e* and 1*f* show alternate means for attaching the slidable indicator 42 to the portfolio 12, including a groove 44 with a T-shaped cross-section cut into the front portion 16 of the portfolio 12. The slidable indicator 42 has an I-shaped cross-section including a lower portion 46, a stem portion 48, and an upper portion 50. The groove 44 is sized to allow movement of the slidable indicator 42 while retaining the lower portion 46 and the stem portion 48 of the slidable indicator 42 when it is engaged in the groove 44. The upper portion 50 of the slidable indicator 42 may be shaped as a triangle as shown, or a circle, a square, or other geometric shape. For novelty, a drinking or eating establishment may use a shape of an animal, a person, or any other desired symbol, such as a mascot or logo. The use of such a symbol on the slidable indicator 42 also pertains to other embodiments of indicator means discussed herein. From the examples of embodiments of slidable indicators shown in FIGS. 1–1*f*, many variations in shape and sliding mechanisms associated the slidable indicators are possible. The present invention is not intended to be limited to the embodiments discussed herein.

Figure 2:
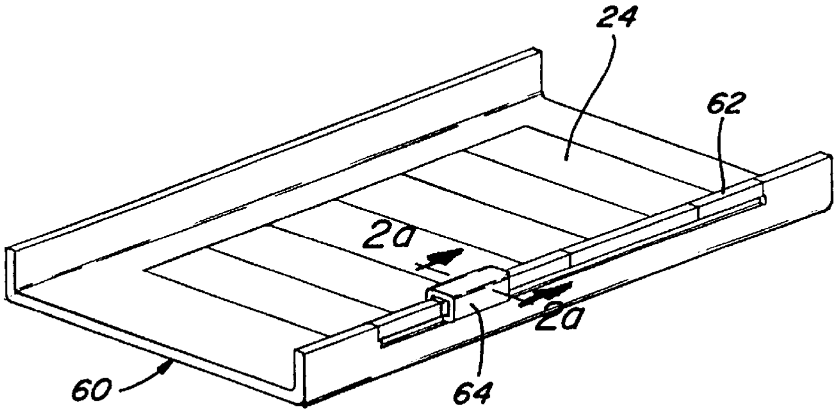
FIG. 2 is a perspective view of a tray having a color-coded bar and indicator means along one edge.
Figure 2A:
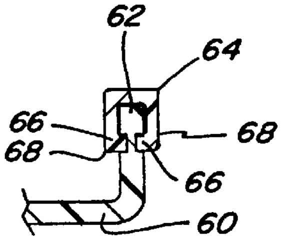
FIG. 2*a* is a cross-sectional view of indicator means for engaging an edge of a tray.

FIG. 2 shows an alternative embodiment of the present invention including a tray 60, a color-coded bar 62 along one edge of the tray 60, a slidable indicator 64 movably mounted adjacent the color-coded bar 62. The legend 24 may be printed on the tray 60, or a placard with the text printed on it may be placed in the tray 60 adjacent the color-coded bar 62. The tray 60 may have a clip (not shown), a pocket (not shown), and/or raised edges around the perimeter of the tray for retaining the check and payment. The color-coded bar 62 may be placed along any edge of the tray 60. The slidable indicator 64 may have any desired shape as discussed hereinabove and a variety of means that are well known in the art may be used for retaining the slidable indicator 64 on the tray 60. For example, the tray 60 may include channels 66 on either side of the edge having the color-coded bar 62 attached thereto as shown in FIG. 2*a*. The slidable indicator 64 may have a U-shaped cross-section with overhanging flanges 68 to engage the respective channels 66 for sliding movement therein. Alternatively, a slot (not shown) may be cut in the tray 60 under the color-coded bar 62 to engage an indicator 40 such as shown in FIG. 1*c*. The groove 44 construction shown in FIGS. 1*e* and 1*f* may also be used in the tray 60.

Figure 3A:
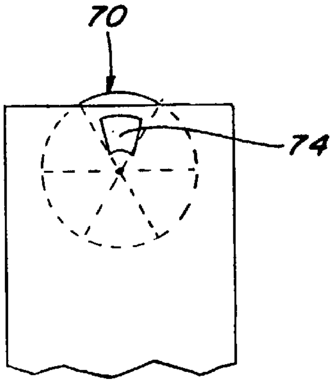
FIG. 3*a* is a front view of a portfolio or tray including a rotatable disk and a window for exposing a portion of the rotatable disk.
Figure 3:
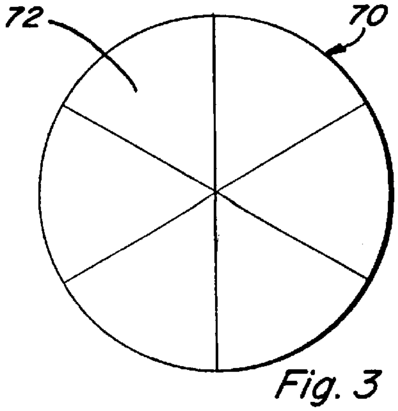
FIG. 3 is a front view of indicator means including a rotatable disk divided into differently colored subsections.

A variety of alternative indicator means may be used with the portfolio 12 or the tray 60 instead of the color-coded bars 20, 62, and the slidable indicators 22, 40, 64. One alternative indicator means is shown in FIG. 3 as a disk 70 with markings that divide the disk 70 into subsections 72, each subsection 72 being a different color. Text may be included in each subsection 72 that describes the significance of each color. For example, the text shown in subsections 26 through 36 in FIG. 1*b* could be used in the subsections 72 of the disk 70. The disk 70 may be rotatably mounted under an indicator window 74 on a tray, portfolio, or other device for holding the patron's check and payment. As shown in FIG. 3*a*, a portion of the edge of the disk 70 protrudes from the portfolio 12 so that the patron may rotate the disk 70 until the desired color appears in the indicator window 74. The disk 70 may be mounted to the inner portion of a portfolio 12 using a grommet (not shown) or any other type of fastener means that retains the disk 70 while it is rotated. The disk may be constructed from metal, plastic, wood, laminated cardboard, or other suitable material, and may be knurled to facilitate rotation. The indicator window 74 may be cut out of the front portion 16 of the portfolio 12 to expose a portion of the disk 70 underneath. The indicator window 74 may have any desired shape, but should be large enough to allow a waiter to see it from a reasonable distance. In a tray 60 as shown in FIG. 3*b*, the disk 70 may be positioned in a slot 76 and a portion of the edge of the disk 70 may protrude to allow the patron to rotate the disk 70. An indicator window 74 may be cut in the tray 60 to expose a portion of the disk 70 underneath.

Figure 4:
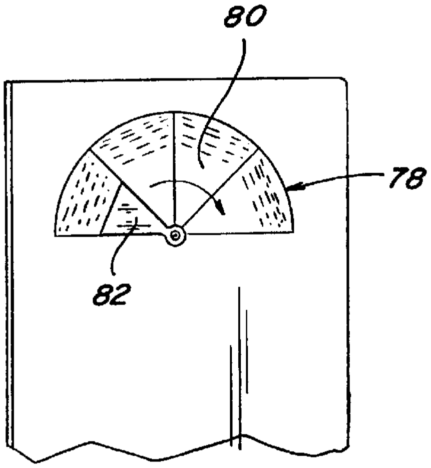
FIG. 4 is a front view of indicator means including a semi-circular portion divided into differently colored subsections and a rotatable indicator.

A further alternative for indicator means is shown in FIG. 4 including an arcuate member such as, for example, a semi-circle 78 with color-coded subsections 80 mounted on a visible portion of a portfolio, tray, or other device for holding the patron's check and payment. An indicator 82 is rotatably mounted above the semi-circle 78 so that the patron may position the indicator over a subsection 80 that conveys the desired message. Text may be included in each subsection 80 to describe the meaning of each color. The rotatable indicator 82 may be of any shape and size that provides a visible indication of the customer's status from a reasonable distance.

Figure 5:
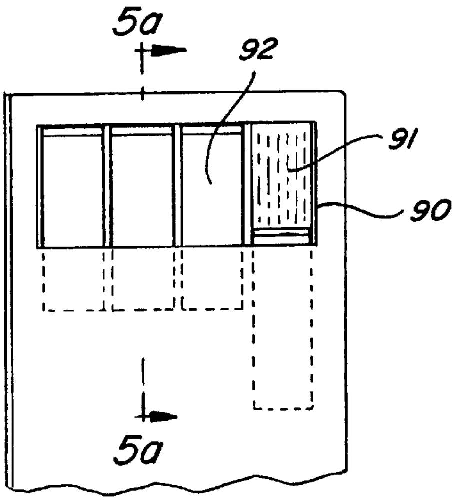
FIG. 5 is a front view of indicator means including a plurality of windows having slidable covers over differently colored subsections.
Figure 5A:
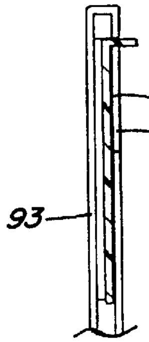
FIG. 5*a* is a side view of indicator means in a check holding device.
Figure 5B:
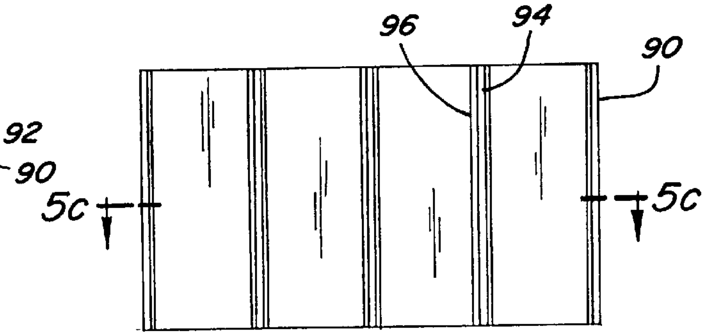
FIG. 5*b* is a front view of guide structure for indicator means
Figure 5D:
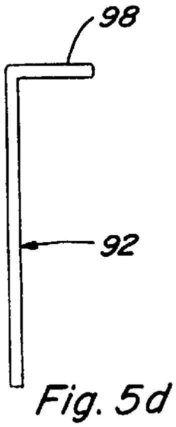
FIG. 5*d* is a side view of a cover.
Figure 5C:
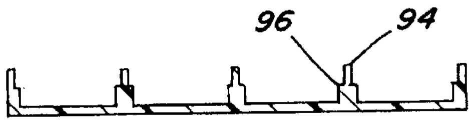
FIG. 5*c* is a cross-sectional view of the guide structure.

FIG. 5 shows another alternate embodiment of the present invention including an opening 90 for a row of windows 91 having covers 92 over them. FIG. 5*a* shows a backing 93 attached behind the opening 90 with suitable attachment means such as glue or tape. Window dividers 94 as shown in FIGS. 5*b* and 5*c* are attached to the backing 93, the window dividers having guide rails 96 along their edges to guide movement of the covers 92 between an opened and a closed position. The covers 92 are sized to extend beyond the bottom portion of each window 91 in both the opened and closed positions so that the covers 92 are retained in the windows 91. The covers 92 may include a tab 98 as shown in FIG. 5*c* to facilitate opening and closing the covers 92. Colored subsections may be applied to the backing 93 so that a different color appears in each window 91. The number of windows 91 included in this embodiment depends on the message requirements or preferences of a particular establishment. Text may be placed on the covers 92 or on the backing 93 for each window 91 to describe the meaning of each color. The covers 92 are typically closed over the windows 91 when the tray, portfolio, or other device is placed on the patron's table. The patron may then open the cover 92 corresponding to the message he wishes to convey to the waiter. When the waiter is finished responding to the patron's request, the cover 92 may be closed. The covers 92 may alternatively be hinged, using means well known in the art, to one edge of the windows 91 to allow the patron to uncover the selected subsection while keeping the other windows closed.

The embodiments described hereinabove are representative of the present invention for an apparatus for holding the check for a patron's order, holding the patron's payment, and indicating patron status in a drinking or eating establishment. It is intended that the various indicator means shown in the drawings may be applicable to a portfolio, tray, or other device for handling payment from a patron. It is also intended that the present invention may be used throughout the time that a patron is seated at a table and is not limited to use during the payment process. Accordingly, the various indicator means are not limited to being attached to a payment handling device such as a portfolio or tray, but alternatively may be attached to the edge of the patron's table or some fixture on the table such as a napkin holder. Each dining or drinking establishment may determine the type of device to which the indicator means may be attached, and the messages, and corresponding colors that should appear on the indicating means to meet their individual requirements.

Other aspects, objects and advantages of the present invention can be obtained from a study of the drawings, the disclosure and the appended claims.

I claim:

1. A device for use by a patron in a restaurant comprising a folder, said folder having a cover foldably attached to a base to form a space therebetween, said cover having an inside portion and an outside portion positioned such that when said cover is closed said inside portion is not visible, said cover further comprising an indicator having a plurality of indicia means on both the inside portion and the outside portion of said cover, said indicator further includes a movable pointer which can be moved to identify a specific one of the plurality of indicia means of said indicator, said movable pointer constructed so that the same specific one of the plurality of indicia means is identified by said movable pointer on both the inside portion and the outside portion of said cover.

2. The device as set forth in claim 1 wherein each specific one of the plurality of indicia means is color-coded to correspond to a different message and the movable pointer is of a color that contrasts with the colors of the plurality of indicia means.

3. The device as set forth in claim 1 wherein the movable pointer includes a clip having a U-shaped cross-section to engage at least one edge of the cover, the clip being retained by frictional forces.

4. The device as set forth in claim 1 wherein the plurality of indicia means are positioned adjacent at least one edge of the outside portion of said cover, the indicator further includes a slot proximate to the at least one edge of the outside portion of said cover, and a band engaged in the slot and wrapped around a portion of the at least one edge of the outside portion of said cover for sliding movement along the at least one edge.

5. The device as set forth in claim 1 wherein the plurality of indicia means are positioned adjacent at least one edge of the outside portion of said cover, the indicator further includes a groove proximate the at least one edge of the outside portion of said cover and the movable pointer is engaged in the groove for sliding movement along the at least one edge.

6. The device as set forth in claim 1 wherein the inside portion of said cover further includes a means for retaining items.

7. The device as set forth in claim 6 wherein the means for retaining items is a pocket.

8. The device as set forth in claim 6 wherein the means for retaining items is a clip.

9. A device for indicating a patron's status in a restaurant, said device comprising:

a folder having a cover foldably attached to said folder, said cover having an outside portion and an inside portion positioned such that when said cover is closed, said inside portion is not visible;

an indicator having a plurality of indicia means on both the outside portion and the inside portion of said cover, said indicator further including a movable pointer capable of identifying a specific one of the plurality of indicia means of said indicator, said movable pointer being constructed so that the same specific one of the plurality of indicia means is identified by said movable pointer on both the outside portion and the inside portion of said cover; and a legend describing a message proximate at least one of the plurality of indicia means on the inside portion of said cover, said cover further including a means for retaining items.

10. The device as set forth in claim 9 wherein the means for retaining items is a pocket on the inside portion of said cover.

11. The device as set forth in claim 9 wherein the means for retaining items is a clip on the inside portion of said cover.

12. The device as set forth in claim 9 wherein each specific one of the plurality of indicia means is color-coded and the movable pointer is of a color that contrasts with the colors of the plurality of indicia means.

* * * * *

UNITED STATES PATENT AND TRADEMARK OFFICE

CERTIFICATE OF CORRECTION

PATENT NO. : 6,050,214

DATED : April 18, 2000

INVENTOR(S) : Penny OKeefe

It is certified that error appears in the above-identified patent and that said Letters Patent is hereby corrected as shown below:

Column 1, line 65, "i" should be --is--.

Signed and Sealed this

Thirtieth Day of January, 2001

Attest:

Q. TODD DICKINSON

*Attesting Officer* *Director of Patents and Trademarks*